United States Patent
Mair (10) Patent No.: US 10,487,931 B2
(45) Date of Patent: Nov. 26, 2019

(54) METHOD FOR ACTUATING A DIFFERENTIAL LOCK OF A DIFFERENTIAL IN A MOTOR VEHICLE DRIVETRAIN

(71) Applicant: ZF Friedrichshafen AG, Friedrichshafen (DE)

(72) Inventor: Roland Mair, Tettnang (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 91 days.

(21) Appl. No.: 15/764,409

(22) PCT Filed: Sep. 28, 2016

(86) PCT No.: PCT/EP2016/073098
§ 371 (c)(1),
(2) Date: Mar. 29, 2018

(87) PCT Pub. No.: WO2017/055343
PCT Pub. Date: Apr. 6, 2017

(65) Prior Publication Data
US 2018/0274645 A1    Sep. 27, 2018

(30) Foreign Application Priority Data
Oct. 1, 2015  (DE) .......................... 10 2015 218 995

(51) Int. Cl.
| | | |
|---|---|---|
| *F16H 48/36* | (2012.01) | |
| *F16H 48/24* | (2006.01) | |
| *F16H 48/20* | (2012.01) | |

(52) U.S. Cl.
CPC ....... *F16H 48/24* (2013.01); *F16H 2048/204* (2013.01)

(58) Field of Classification Search
USPC .......................................................... 701/69
See application file for complete search history.

(56) References Cited

U.S. PATENT DOCUMENTS

| | | | |
|---|---|---|---|
| 4,671,373 A | | 6/1987 | Sigl |
| 4,792,012 A | * | 12/1988 | Morisawa .......... B60K 23/0808 180/247 |

(Continued)

FOREIGN PATENT DOCUMENTS

| | | |
|---|---|---|
| DE | 33 42 574 A1 | 6/1985 |
| DE | 42 92 208 T1 | 4/1994 |

(Continued)

OTHER PUBLICATIONS

German Search Report Corresponding to 10 2015 218 995.3 dated Aug. 25, 2016.

(Continued)

*Primary Examiner* — Dirk Wright
(74) *Attorney, Agent, or Firm* — Davis & Bujold PLLC; Michael J. Bujold (57) ABSTRACT

The invention concerns a method for actuating a differential lock of a differential in a motor vehicle drive-train, such that when a locking command has been issued the differential lock is engaged as soon as there is essentially no rotational speed difference at the differential lock (S8). To carry out a comfort-orientated actuation of the differential lock, when the locking command has been issued but before the differential lock is engaged, it is first checked whether there is a rotational speed difference at the differential lock (S6). If there is a rotational speed difference, this is automatically reduced before the differential lock is engaged (S7).

13 Claims, 3 Drawing Sheets

(56) References Cited

U.S. PATENT DOCUMENTS

| | | | | |
|---|---|---|---|---|
| 4,860,208 A * | 8/1989 | Bantle | ................ | B60K 23/0808 |
| | | | | 701/69 |
| 5,041,978 A * | 8/1991 | Nakayama | ......... | B60K 23/0808 |
| | | | | 180/197 |
| 5,197,566 A * | 3/1993 | Watanabe | .......... | B60K 23/0808 |
| | | | | 180/197 |
| 5,301,768 A * | 4/1994 | Ishikawa | ............ | B60K 23/0808 |
| | | | | 180/197 |
| 6,108,601 A | 8/2000 | Breithor et al. | | |
| 6,336,069 B1 * | 1/2002 | Hasegawa | ............... | B60K 23/04 |
| | | | | 180/197 |
| 6,758,297 B2 * | 7/2004 | Handa | .................... | B60K 23/08 |
| | | | | 180/247 |
| 6,820,947 B2 * | 11/2004 | Atoche-Juarez | ...... | B60T 8/1769 |
| | | | | 303/143 |
| 6,834,225 B1 * | 12/2004 | Jiang | ....................... | B60K 17/35 |
| | | | | 180/197 |
| 7,195,579 B2 * | 3/2007 | Claussen | ................ | B60K 23/08 |
| | | | | 477/107 |
| 7,810,601 B2 * | 10/2010 | Hamrin | ................ | B60K 28/165 |
| | | | | 180/233 |
| 8,483,921 B2 * | 7/2013 | Sakagami | ............... | B60K 23/00 |
| | | | | 180/247 |
| 8,989,979 B2 * | 3/2015 | Taniguchi | ............. | B60W 10/06 |
| | | | | 701/69 |
| 9,382,992 B2 | 7/2016 | Vanderpool et al. | | |
| 9,605,740 B2 * | 3/2017 | Povirk | ................. | B60K 17/344 |
| 9,809,207 B2 * | 11/2017 | Frijas | ...................... | B60T 8/175 |
| 2007/0179699 A1 * | 8/2007 | Kinsey | ................ | B60K 28/165 |
| | | | | 701/82 |

FOREIGN PATENT DOCUMENTS

| | | |
|---|---|---|
| DE | 197 23 324 A1 | 12/1998 |
| DE | 199 24 388 C1 | 7/2001 |
| DE | 10 2010 040 714 A1 | 4/2011 |
| DE | 20 2015 104 794 U1 | 1/2016 |
| JP | 2003-014084 A | 1/2003 |
| JP | 2006-064051 A | 3/2006 |
| JP | 2008-089092 A | 4/2008 |

OTHER PUBLICATIONS

International Search Report Corresponding to PCT/EP2016/073098 dated Jan. 19, 2017.

Written Opinion Corresponding to PCT/EP2016/073098 dated Jan. 19, 2017.

* cited by examiner

METHOD FOR ACTUATING A DIFFERENTIAL LOCK OF A DIFFERENTIAL IN A MOTOR VEHICLE DRIVETRAIN

This application is a National Stage completion of PCT/EP2016/073098 filed Sep. 28, 2016, which claims priority from German patent application serial no. 10 2015 218 995.3 filed Oct. 1, 2015.

FIELD OF THE INVENTION

The invention relates to a method for actuating a differential lock of a differential in a motor vehicle drive-train, such that when a lock command occurs the differential lock is engaged as soon as there is essentially no rotational speed difference at the differential lock. Furthermore, the invention relates to a control unit for a differential lock, a computer program product and a data carrier comprising the computer program product.

BACKGROUND OF THE INVENTION

In the drive-trains of motor vehicles, particularly in the case of off-road vehicles, differential locks are often provided in transverse and/or longitudinal differentials in order to enable propulsion of the motor vehicle, particularly when the ground conditions are difficult and individual wheels or even entire axles slip. For this, in most cases a differential lock is made in the form of a frictional or interlocking clutch, which when actuated prevents a compensation movement of the differential concerned. At least in the case of an interlocking differential lock, it is first necessary to reduce any rotational speed difference at the differential lock before the differential lock can be engaged. Whereas classically this has to be carried out by the vehicle driver at the time, in that he reduces the drive torque in a controlled manner and thereby brings about a synchronization, systems are also known in which the synchronization required for the engagement of the differential lock is produced automatically.

Thus, DE 42 92 208 T1 describes a method for actuating a differential lock of a differential in a motor vehicle drive-train, such that when a driver of the vehicle issues a locking command the differential lock is engaged as soon as there is essentially no rotational speed difference at the differential lock. Specifically, this is brought about in that when the driver issues the locking command, a rotational speed of a drive machine of the motor vehicle is reduced in a controlled manner and thereby a reduction of a drive torque is produced, which results in a corresponding reduction of any rotational speed difference there might be at the differential lock. In this case the rotational speed of the drive machine is reduced for a certain time interval within which a reduction of the rotational speed difference sufficient for the engagement of the differential lock is to be expected. Directly after that, the differential lock is engaged in order to lock the differential concerned. These steps take place automatically following the issuing by the vehicle's driver of the locking command, i.e. the vehicle's driver does not actively have to reduce the rotational speed of the drive machine in order to reduce the slip in the area of the differential concerned.

SUMMARY OF THE INVENTION

Starting from the above-described prior art, it is now the purpose of the present invention to enable a differential lock of a differential to be engaged by a comfort-orientated method without any possibility of damage in particular to a lock designed as an interlocking differential lock.

From the method-technological standpoint this objective is achieved starting from the features of the independent claims. The subsequent, dependent claims in each case indicate advantageous further developments. From the standpoint of equipment technology, the objective is achieved in accordance with further independent claims. A computer program product and a data carrier comprising it are in addition the objects of yet further independent claims.

According to the invention, in a method for actuating a differential lock of a differential in a motor vehicle drive-train, when a locking command has been issued the differential lock is engaged as soon as there is essentially no rotational speed difference at the differential lock. In the context of the invention, the differential in the motor vehicle drive-train can be a transverse differential, i.e. a differential that distributes drive movement to drive wheels of an axle, or else a longitudinal differential by which drive movement is distributed to a plurality of driven axles. In this case the differential lock is a mechanical lock which, when actuated, prevents any compensation movement by the differential. Specifically, the differential lock is in particular a clutch and preferably an interlocking clutch such as a claw clutch. However, in the context of the invention the differential lock can in principle also be a frictional clutch such as a disk clutch.

The method is applied in a drive-train of a motor vehicle, the motor vehicle being a passenger car or even a utility vehicle such as a truck. In particular, it is also conceivable to use the method with an off-road motor vehicle. According to the invention, "essentially no rotational speed difference" is understood to mean that there is either a very small rotational speed difference or none at all at the differential lock, the decisive criterion being whether despite any rotational speed difference that may exist the differential lock can be engaged without damage. Thus, if the rotational speed difference is so small that the differential lock can be engaged without problems, then in the context of the invention it can indeed be said that there is essentially no rotational speed difference.

The invention now is based on the technical principle that when a locking command has been issued but before the differential lock is engaged, it is first checked whether there is a rotational speed difference at the differential lock. If the existence of a substantial rotational speed difference is detected, then this is reduced automatically before the differential lock is engaged. In other words, between the issuing of the locking command and the engagement of the differential lock, it is checked whether there is any substantial rotational speed difference at the differential lock. If there is, then without the driver of the vehicle having to do anything this rotational speed difference is reduced before the differential lock is actuated.

Such a method for actuating a differential lock has the advantage that any rotational speed difference at the differential lock is reduced before the differential lock is engaged, so that damage or even increased wear at the differential lock can be prevented, whereas the vehicle's driver need not take any active measures for that. During this, however, measures for reducing any rotational speed difference are only taken when after the locking command has been issued there is a substantial rotational speed difference at the differential lock. Correspondingly, the differential lock is engaged immediately after the locking command if there is no rotational speed difference. Overall, therefore, it can be said that by virtue of the method according to the invention a comfort-orientated actuation of the differential lock can be carried out without damage to or increased wear of the differential lock.

By contrast with this, according to DE 42 92 208 T1 the rotational speed of the drive machine is always reduced as soon as a locking command is issued by the vehicle's driver. In other words it is not checked whether the rotational speed difference and thus also the reduction of the drive torque are at all necessary, because perhaps there is no rotational speed difference at all at the differential lock. Such a motor intervention, however, has a comfort-diminishing effect since it takes place every time as soon as the vehicle's driver actuates the differential lock even in anticipation of an impending driving situation ahead. As a result, although it is true that any risk to the differential lock is reliably prevented, the constantly occurring intervention in the driving operation has a comfort-reducing effect.

In the context of the invention "rotational speed difference" means the difference between the rotational speeds of the components to be coupled by means of the differential lock. Thus, the rotational speed difference characterizes the rotational speed difference between the clutch halves of the differential lock. Furthermore, an essential feature of the invention is that any reduction of rotational speed differences that may be necessary takes place automatically, i.e. without the need for any active steps by the vehicle's driver.

In the context of the invention, the rotational speed difference reduction can be produced in one way or even more than one way at the same time. Thus, according to the invention it is conceivable to bring about the reduction of the rotational speed difference by a controlled reduction of a drive torque of a drive machine of the motor vehicle, until the wheel or wheels grip and the rotational speed difference is thereby reduced. Alternatively or in addition, the wheel or wheels that are slipping can be acted upon by a respective brake system to bring about or accelerate the reduction of the rotational speed difference. Also alternatively or in addition to the two aforesaid possibilities, a separator clutch of the drive-train can be opened in order to reliably disconnect the drive wheels from torque. This is imperatively necessary if the motor rotational speed of the drive machine is close to the idling rotational speed or reaches it during the intervention. In addition to this, if necessary a gearshift in a motor vehicle transmission of the motor vehicle's drive-train must be carried out in order to obtain a suitable gear for continued driving.

In particular the aforesaid measures for reducing the rotational speed difference remain active until the differential lock generates a feedback signal indicating that the differential lock has been engaged. Alternatively or in addition, however, the measures can be terminated after the lapse of a maximum time so that in this case pure time-control without a feedback signal is realized.

In correspondence with an embodiment of the invention, the locking command has to be issued by a vehicle driver. Thus, in this case the specific command of the vehicle's driver is needed in order to activate the differential lock, whereby its engagement and the possibly necessary prior reduction of the rotational speed difference take place automatically. Thus, in such a case the system is designed in the manner of a driver-assistance system, which assists the driver when engaging the differential lock.

In a further development of the aforesaid embodiment, the existence of a locking criterion is reported to the vehicle's driver for the issuing of the locking command. Thus, it is reported to the vehicle's driver that a condition exists in which the engagement of the differential lock is to be recommended. Particularly preferably, the vehicle's driver is alerted to the existence of the locking criterion in that, for example, in the area of the on-board instruments a corresponding display is activated. Thus, it is conceivable to allow the display recommending the activation of the differential lock to appear on a corresponding video screen of an on-board computer, or to activate a corresponding light.

In accordance with a design possibility alternative to the aforesaid embodiment of the invention, the locking command is issued automatically when a locking criterion exists. Thus, in this case the system is designed as a fully automatic system in which the activation of the differential lock is initiated as soon as by virtue of the locking criterion a condition exists in which the driving behavior of the motor vehicle would be improved by engaging the differential lock.

In a further development of one of the two above embodiments, as the locking criterion the presence of slip between drive output sides of the differential is detected. In the context of the invention "slip" is understood to mean an unwanted spinning of a vehicle wheel of an axle or even of an entire driven axle when there are several driven axles, i.e. conditions that result in particular from difficult road conditions and are followed by compensation movements of the differential concerned. Strictly to be distinguished from this are driving situations in which compensation movements in the area of the differential concerned are imperative for the prevention of jamming in the motor vehicle's drive-train, such as when driving round a curve.

In the context of the invention, slip is recognized by detecting a rotational speed difference at the driven axle(s), and then comparing the rotational speed difference detected with a non-driven axle, in order from the comparison to determine whether the rotational speed difference at the driven axle(s) should be attributed to wheel slip or to driving round a curve. In this case, from the rotational speed difference at a non-driven axle it can be recognized whether the vehicle is driving round a curve or straight ahead, and in addition the radius of the curve can be determined. Alternatively or in addition to the above, a steering angle can also be taken into account in the evaluation, which gives direct information about driving round a curve or straight and also about the curve radius if any.

As a further supplement or alternative to what has been described above, a gradient of the rotational speed difference at the driven axle(s) can also be taken into account, as well as the absolute difference and the driving speed of the motor vehicle. Then, if the gradient at one wheel exceeds a certain threshold, which can be chosen as a function of the average vehicle speed, then the rotational speed increase can no longer be attributed to driving round a curve. The same applies if the speed difference exceeds an absolute threshold, if necessary again as a function of the average speed of the vehicle. In these cases too it can be concluded that the drive wheels are supping. Finally, again alternatively or in addition, further driven axles can be included in the comparison, and then average rotational speeds of the axles should be compared and the status of any locking on an axle and if necessary the result of an already completed evaluation of slip can be included. However, when taking the driven axles as reference for the detection of slip, it must be kept in mind that the other axles themselves might be slipping.

Alternatively or in addition to the further development described earlier, as a locking criterion a starting process and the presence of slip between drive output sides of the differential in a previous driving situation is detected, or an activation of a rocking-free function is recognized. Thus, if slip was recognized in a previous driving situation, then the lock can be activated while at rest for the next start. In that case the function can be maintained over a time interval, a driving distance or a number of starts. Moreover it is conceivable to develop further such a function with the gradient when the slip and the gradient are recognized in the starting situation, in that the function is only active when the gradient in the starting situation is larger than the gradient when slip is recognized, having regard to an offset which can be positive or negative. In the case of an activated rocking-free function by means of which, particularly with heavy vehicles, an easier escape from a depression should be enabled, the differential lock can likewise be activated directly since in that case maximum traction is required and spinning of one or even more drive wheels would be counterproductive.

In a further embodiment of the invention, when the locking command issued by a driver of the vehicle and the presence of a locking criterion are notified, a display of the locking criterion is suppressed if at least one boundary condition is not satisfied. Thus, if the current conditions do not authorize locking of the differential or if they make it inadvisable, then the locking criterion is not notified to the vehicle's driver at all since locking of the differential at that point in time is not to be recommended. For example as a boundary condition, a driving speed limit could be considered, above which a differential lock should no longer be activated. Furthermore it can also be taken into account how large the actually occurring slip is, i.e. whether the slip is in fact a significant problem. In addition the occurrence of a straight start could also be a boundary condition, which would have to be the case for the engagement of the differential lock since otherwise the drive-train of the motor vehicle would be mechanically stressed.

In a further development of the embodiment in which the locking command is produced automatically in the presence of a locking criterion, the production of the locking command is suppressed if at least one boundary condition is not satisfied. These boundary conditions are preferably the conditions described earlier. In such a case, therefore, the system does not generate a locking command if one or more boundary conditions are not fulfilled.

According to another possible design of the invention, once the differential lock has been engaged and until it has been deactivated the operation of the drive-train of the motor vehicle is monitored and/or regulated. In particular this is understood to mean how driving with the lock engaged is carried out. In the event that the locking command should be issued by the vehicle's driver, it is preferably displayed to the vehicle's driver when a permissible speed while driving with the lock engaged is reached or exceeded. Alternatively or in addition an intervention at the drive machine can be carried out in order to limit the speed of the vehicle. Also alternatively or in addition to that, it can be displayed to the driver that there is no longer any slip between one or more non-driven axles and the locked axle, and for that purpose the average axle speeds have to be compared. However, after an activation of the lock such a display can also be suppressed for a minimum time or a minimum distance, since it is assumed that the lock was required and the situation requiring it cannot be resolved arbitrarily quickly. Alternatively or in addition, a corresponding message can also be suppressed for as long as the vehicle is still on a gradient or if the gradient has not decreased by at least a certain value since the lock was activated.

In the case of the automatic cancellation of a locking command, it is also conceivable to limit the speed of the vehicle by action upon the drive machine. Alternatively or in addition, the lock can be deactivated if there is no slip between one or more non-driven axles and the locked axle, and here too the average axle speeds have to be compared. Moreover. here too, once the lock has been activated its deactivation can be suppressed for a minimum time or a minimum distance, since in this case as well an arbitrarily quick resolution of the situation cannot be assumed. Also alternatively or in addition, deactivation can be suppressed for as long as the vehicle is on a gradient or if the gradient has not decreased by at least a certain value since the lock was activated. In the case when the differential lock was activated on the basis of an activation of a rocking-free function, deactivation of the differential lock can also be associated with the end of the rocking-free process or the deactivation of the rocking-free function.

An object of the invention is also a control unit for a differential lock of a differential, such that with the control unit the previously described procedural steps can be carried out. Thus, the control unit comprises a device, preferably in the form of a processor, by means of which when a locking command has been issued the differential lock can be engaged as soon as there is essentially no rotational speed difference at the differential lock. To be specific, when a locking command exists but before the differential lock is engaged it is checked whether there is a rotational speed difference at the differential lock, and the device is designed in such manner that if there is a rotational speed difference, that difference is reduced before the engagement of the differential lock is initiated. A further object of the invention is a computer program product for such a control unit, by which the routine for engaging the differential lock is implemented by corresponding control commands stored in software and a processor of the control unit. Finally, the invention relates to a data carrier with a computer program product as aforesaid.

The invention is not limited to the stated combination of the ancillary claims or those that depend on them. There are also additional possibilities for combining individual features with one another, insofar as they emerge from the claims, the description given below or directly from the drawings. References in the claims to the drawings by the use of indexes is not intended to limit the protective scope of the claims.

BRIEF DESCRIPTION OF THE DRAWINGS

Advantageous embodiments of the invention, which are explained below, are represented in the drawings, which show.

DETAILED DESCRIPTION OF THE PREFERRED EMBODIMENTS

Figure 1:
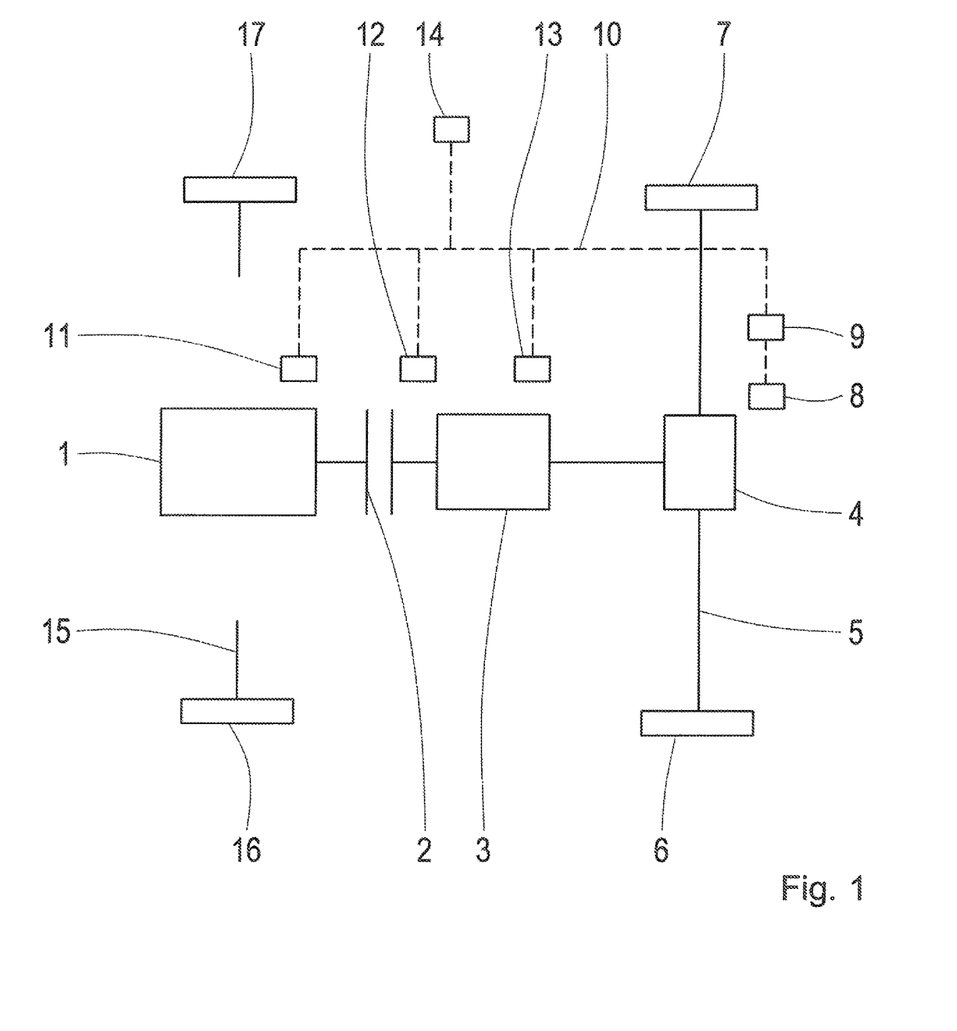
FIG. 1: A schematic view of a motor vehicle in which a differential lock can be actuated in accordance with the invention.

FIG. 1 shows a schematic view of a motor vehicle, which can be a passenger car or a utility vehicle such as a truck. In a motor vehicle drive-train of the motor vehicle a drive machine 1 can be connected by way of an intermediate separator clutch 2 to a motor vehicle transmission 3, and a differential 4 is connected downstream from the motor vehicle transmission 3, which is designed as a transverse differential of a driven axle 5 and distributes drive movement to two drive wheels 6 and 7 of the axle 5.

Associated with the differential 4, which in this case can be in the form of a bevel gearwheel differential or some other structural form known in principle to those with knowledge of the field, is a differential lock 8 which in this case is in the form of an interlocking clutch such as a claw clutch and which, when actuated, prevents a compensation movement of the differential 4. Actuation of the differential lock 8 is regulated by a control unit 9 connected to a data bus 10 of the motor vehicle. Besides the control unit 9, the data bus 10 is also connected to a control unit 11 of the drive machine 1, a control unit 12 of the separator clutch 2 and a control unit 13 of the motor vehicle transmission 3. From the data bus 10, furthermore, data from a wide variety of sensors 14 of the motor vehicle are available, which the control units 9, 11, 12 and 13 can use for corresponding regulation purposes.

The motor vehicle also comprises a non-driven axle 15—in this case only indicated—with two wheels 16 and 17. If appropriate, besides this non-driven axle 15 there can be other non-driven axles as well.

Figure 2:
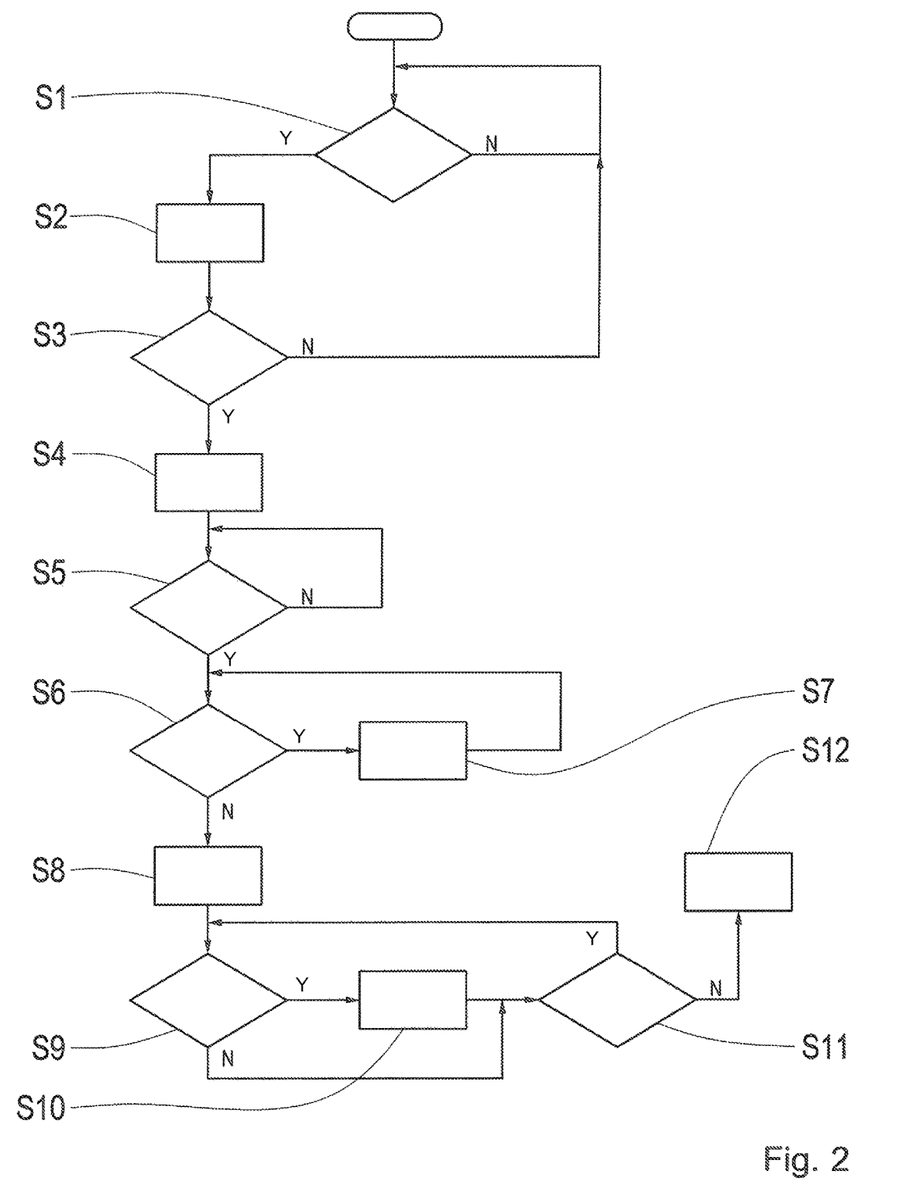
FIG. 2: A flow chart of a method for actuating a differential lock, according to a first embodiment of the invention.

FIG. 2 now shows a flow chart of a method by means of which actuation of the differential lock 8 of the differential 4 can be controlled, which method is designed in accordance with a first embodiment of the invention. At the beginning of the method, in a step S1 it is ascertained whether at the time there is any slip between the drive wheels 6 and 7 of the axle 5, and for that purpose the rotational speeds of the drive wheels 6 and 7 are compared in relation to one another and from that a rotational speed difference is determined. This rotational speed difference is then compared with a rotational speed difference determined from the rotational speeds of the wheels 16 and 17 of the non-driven axle 15. If their rotational speed differences agree with one another, this indicates that the motor vehicle is driving round a curve, whereas if they are different it can be presumed that slip is taking place between the drive wheels 6 and 7.

Alternatively or also additionally, a current steering angle can be taken into account in the evaluation, which gives direct information about whether the motor vehicle is driving round a curve or straight ahead. Also alternatively or in addition, a gradient of the rotational speed difference at the axle 5 can be taken into account, as well as an absolute difference and the current driving speed of the motor vehicle. If at one of the drive wheels 6 or 7 the gradient exceeds a certain threshold value, which can be chosen to depend on the average speed of the motor vehicle, then the rotational speed increase can no longer be attributed to driving round a curve. The same applies if the speed difference exceeds an absolute threshold, which threshold can again be chosen to depend on the average speed of the vehicle.

If finally slip is recognized in step S1, then the system moves on to a step S2, while otherwise it springs back to before step S1. In step S2, with the existing slip a locking criterion is then recognized as existing and in a following step S3 it is ascertained whether boundary conditions are satisfied, which must be present for an actuation of the differential lock 8. In this case the boundary conditions include that the current driving speed must be below a speed limit, above which limit the differential lock 8 may not be engaged. Furthermore, the boundary conditions can also include checking whether the vehicle is not, or is only slightly slowing down, i.e. although slip is taking place it is not a significant problem. If in step S3 all the boundary conditions are seen to be fulfilled, the system moves on to a step S4, whereas otherwise it springs back to before step S1.

In step S4, with a display of the current driving situation the driver is recommended to actuate the differential lock 8. Thereafter, in a step S5 it is ascertained whether the vehicle's driver has issued a corresponding locking command and if the locking command has been given, the system changes over to a step S6 whereas otherwise it springs back to before step S5.

Before the engagement of the differential lock 8, it is first ascertained in a step S6 whether there is a rotational speed difference at the differential lock 8, i.e. whether the two components of the differential 4 to be connected to one another in a rotationally fixed manner are rotating at different speeds. If so, then in a step S7 measures are adopted for reducing the rotational speed difference automatically, in that by action of the control unit 9 upon the control unit 11 the drive torque of the drive machine 1 is reduced in a controlled manner, and so too therefore is the drive torque at the drive wheels 6 and 7, until they grip again and the rotational speed difference is thereby reduced.

Alternatively or in addition to this, if necessary the control unit 9 can also act upon a brake of the slipping wheel 6 or 7 in order brake it selectively and thereby assist or speed up the slip reduction. If in addition the drive machine 1 is already close to its idling speed, then it is alternatively or additionally conceivable that during step S7 the control unit 9 acts upon the control unit 12 and compels the opening of the separator clutch 2 in order to disconnect the drive wheels 6 and 7 from any torque and thereby also to bring about a reduction of the slip. In some circumstances, in parallel with the above a gearshift must be carried out in the motor vehicle transmission 3 by the control unit 13, into a gear suitable for continuing to drive.

After the measure or plurality of measures in Step 7 have been carried out, the system reverts to before step S6 and the presence of a rotational speed difference at the differential lock 8 is again checked. If this is still present, then step S7 is repeated whereas if not the system moves on to step S8, in which the differential lock 8 is engaged. The same applies if, previously, there was no rotational speed difference at the differential lock 8. By virtue of the actuated differential lock 8, compensation movement of the differential 4 is prevented and drive input movement is distributed uniformly and solidly to the two drive wheels 6 and 7.

Following step S8, in a step S9 it is ascertained whether a permissible speed for driving with the differential lock 8 engaged has been reached or even exceeded. If so, then in a step S10 the speed of the vehicle is restricted by action upon the control unit 11 and after that the system moves on to a step S11, whereas if the result is negative step S9 follows directly. In step 11 it is then checked whether there is still slip between the drive wheels 6 and 7. For that purpose it is ascertained whether there is slip between the non-driven axle 15 and the driven and locked axle 5, wherein for this the average axle speeds are compared. If there is still slip, then the system springs back to before step S9, whereas in the opposite case the system moves on to a step S12 in which the display recommends to the vehicle's driver that the differential lock 8 should be deactivated again.

However, in step 12 it is also conceivable to suppress that message at first for a minimum time or a minimum distance, since it is assumed that the lock was required and that situation requiring it does not disappear arbitrarily quickly. Furthermore, the message can also be suppressed for as long as the vehicle is on a gradient or the gradient has not decreased by at least a certain value since the differential lock 8 was activated. When the differential lock 8 has been deactivated, the process can begin again from the start.

Figure 3:
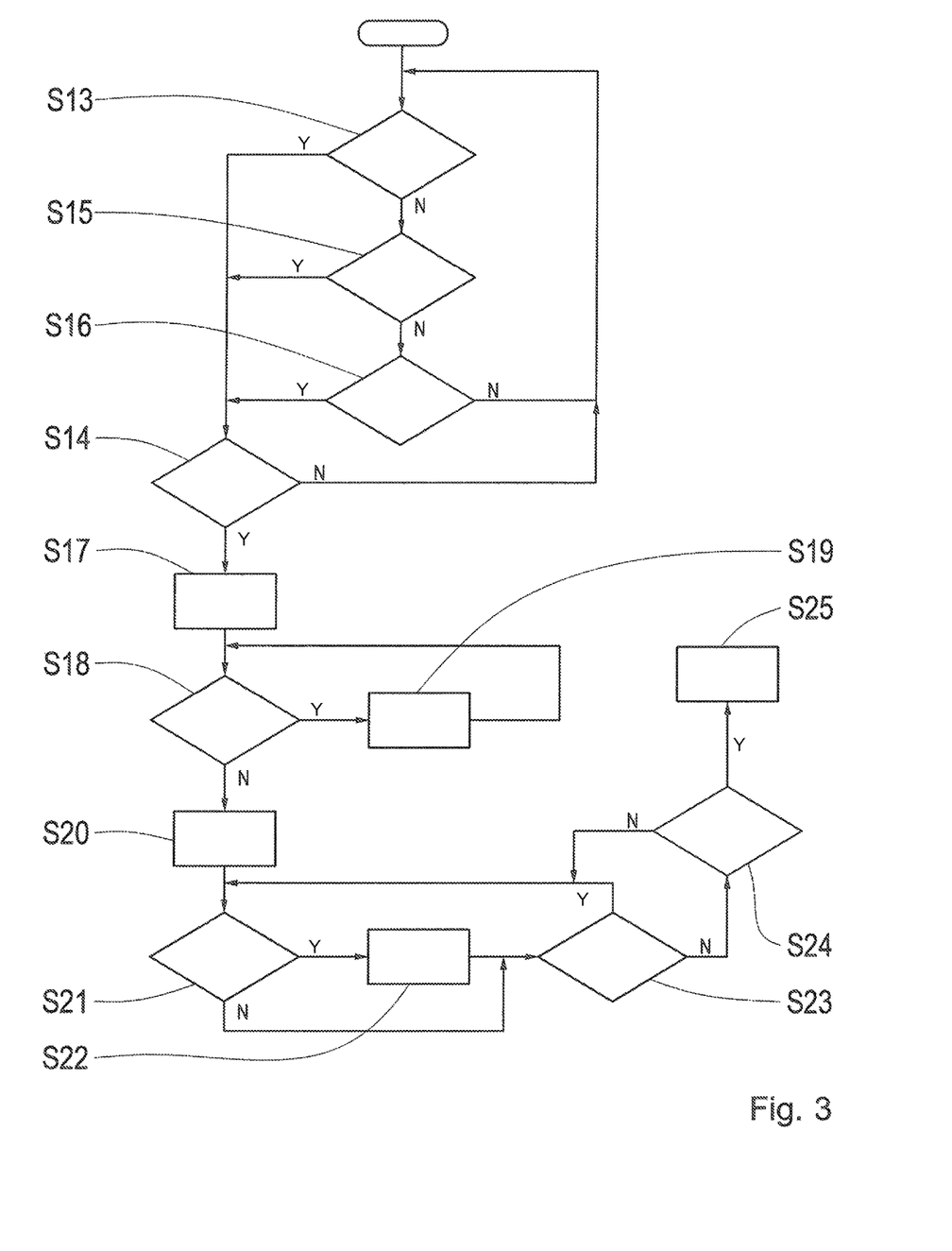
FIG. 3: A flow chart of a method for actuating a differential lock, according to a second possible version of the invention.

FIG. 3 shows a flow chart of a method for actuating the differential lock 8 of FIG. 1, which can be used as an alternative to the method of FIG. 2 and which represents a second possible design version of the invention. In the context of this method too, at the beginning in step S13 it is first ascertained whether slip is taking place between the drive wheels 6 and 7 of the axle 5. In this case, analogously to the method of FIG. 2 a rotational speed difference is computed from the rotational speeds of the drive wheels 6 and 7, and this is then compared with a rotational speed difference of the wheels 16 and 17 of the axle 15, in order to be able to recognize whether the motor vehicle is driving round a curve. From the rotational speed difference of the non-driven axle 15 it can even be concluded whether the vehicle is driving round a curve or straight ahead, and the radius of the curve is also recognized.

Alternatively or in addition to this, a steering angle can again also be taken into account in the evaluation, which gives direct information about driving round a curve or straight ahead and also about the curve radius if any. Also alternatively or in addition thereto, a gradient of the rotational speed difference at the axle 5 can be computed as well as the absolute difference and the speed of the vehicle. If then the gradient at one of the drive wheels 6 or 7 exceeds a threshold that can be chosen as a function of the average driving speed, then the rotational speed increase can no longer be attributed to driving round a curve. The same applies if the rotational speed difference exceeds an absolute threshold, if necessary again as a function of the average driving speed. In these cases too the presence of slip can be concluded.

If the result in step S13 is positive, the system moves on to a step S14, while otherwise a step S15 comes after the step S13. In step S15, as a further locking criterion it is ascertained whether slip was recognized in a previous driving situation and whether a starting process consequently has to be carried out. If so, the system goes back again to step S14 and that locking criterion can be maintained for a time interval, a distance driven or even a number of starts. Moreover, here too an inclination of the road can be taken into account in that the function only becomes active if the inclination in the starting situation is larger than the inclination when slip was recognized, taking into account a positive or negative offset.

In contrast, if the result in step S15 is also negative, step S15 is followed by a step S16 in which it is ascertained whether at the time a rocking-free function of the motor vehicle is activated. If so, then the system again moves back to step S14, whereas if not, it springs back to before step S13. The positive result from one of steps S13, S15 or S16 thus suffices for step S14 to be carried out.

In step S14 it is ascertained whether various boundary conditions for the engagement of the differential lock 8 are fulfilled. Thus, it is checked whether a current driving speed of the motor vehicle is below a limiting speed above which the differential lock 8 should no longer be activated. In addition, here it can also be checked whether the vehicle is not, or is only slightly decelerating, so that slip is taking place but is not a significant problem. If in step S14 these boundary conditions are satisfied, the system moves on to step S17, otherwise it springs back to before step S13.

The object of step S17 is then to produce a locking command for engaging the differential lock 8. However, before the differential lock 8 is actually engaged, in step S18 it is ascertained whether at the time there is a rotational speed difference at the differential lock 8, i.e. whether the components of the differential 4 to be connected rotationally fixed to one another are rotating at different speeds. If so, then in step S19 an attempt is made to reduce this rotational speed difference, and to do that an intervention is carried out at the control unit 11 to bring about a controlled reduction of a drive torque of the drive machine 1 and thereby restore the grip of the drive wheels 6 and 7. Otherwise, the system moves on to a step S20.

Alternatively or in addition to the above, a brake of the slipping drive wheel 6 or 7 can also be acted upon to brake it appropriately and therefore assist or accelerate the reduction of the slip. Also alternatively or in addition, by acting upon the control unit 12 the separator clutch 2 can be opened in order reliably to disconnect the drive wheels 6 and 7 from torque. This is also imperatively necessary when a rotational speed of the drive machine 1 is close to its idling speed or would reach the idling speed during the intervention. If needs be, in the motor vehicle transmission 3 a gearshift should also be carried out in order to obtain a gear suitable for continuing to drive.

After step S19, the system goes back to before step S18 and once more the presence of a rotational speed difference is checked. If the difference has been reduced or there was never any difference, then the system can move on to step S20 wherein the differential lock 8 is engaged and thereafter the differential 4 is locked.

Step S20 is then followed by a step S21 in which it is checked whether a current driving speed exceeds a limit speed for driving with the differential engaged. If the limit is being exceeded, then in a step S22 the vehicle's speed is brought to and kept below the limit by action upon the drive machine 1. Thereafter, the system moves on to a step S23, which follows directly after step S21 if the result in the latter is negative.

In step S23 it is then ascertained if there is any slip between the driven axle 5 and the non-driven axle 15, and for this average speeds are compared with one another. If there is still slip, then the system springs back again to before step S21, while otherwise step S24 comes next. In this, a current inclination of the road is ascertained and it is checked whether the road inclination has decreased by a certain amount since the differential lock 8 was activated. If not, the system again springs back to before step S21, whereas if so deactivation of the differential lock 8 is initiated in step S25. If necessary, however, this deactivation can be suppressed for a minimum time or a minimum distance, since it can be assumed that a situation which justified the engagement of the differential lock 8 would not be resolved arbitrarily quickly. Likewise, a direct deactivation of the differential lock 8 can be carried out if its activation is based on the activation of the rocking-free function in step S16, and the rocking-free function has now been deactivated again. Starting from step S25, the process then begins afresh from step S13.

By virtue of the method according to the invention for actuating a differential lock, comfort-orientated actuation can be carried out while at the same time damage or excessive wear of the differential lock can be reliably excluded.

INDEXES

1 Drive machine
2 Separator clutch
3 Motor vehicle transmission
4 Differential
5 Axle
6 Drive wheel
7 Drive wheel
8 Differential lock
9 Control unit
10 Data bus
11 Control unit
12 Control unit
13 Control unit
14 Sensors
15 Axle
16 Wheel
17 Wheel
S1 to S25 Individual process steps

The invention claimed is:

1. A method for actuating a differential lock of a differential in a motor vehicle drive-train, the method comprising:
   if a locking command has been issued, engaging the differential lock as soon as there is essentially no rotational speed difference at the differential lock,
   after the locking command has been issued and before the differential lock is engaged, checking whether there is a rotational speed difference at the differential lock, and
   if a rotational speed difference exists, reducing the rotational speed difference before the differential lock is engaged.

2. The method according to claim 1, wherein the locking command has to be issued by a driver of the vehicle.

3. The method according to claim 2, further comprising reporting a presence of a locking criterion to the driver of the vehicle for issuing the locking command.

4. The method according to claim 1, further comprising automatically generating the locking command when a locking criterion exists.

5. The method according to claim 3, further comprising detecting, as a locking criterion, a presence of slip between drive output sides of the differential.

6. The method according to claim 3, further comprising either detecting, as the locking criterion, a starting process and a presence of slip between drive output sides of the differential during a previous driving situation, or recognizing, as the locking criterion, an activation of a rocking-free function.

7. The method according to claim 3, further comprising suppressing a display of the locking criterion, if at least one boundary condition is unfulfilled.

8. The method according to claim 4, further comprising suppressing production of the locking command if at least one boundary condition is unfulfilled.

9. The method according to claim 1, further comprising at least one of monitoring and regulating operation of the motor vehicle drive-train after the differential lock has been engaged and until the differential lock has been deactivated.

10. A control unit for a differential lock of a differential, the control unit comprising a device by means of which, when a locking command has been issued, the differential lock is engagable as soon as there is essentially no rotational speed difference at the differential lock, such that by means of the device, when the locking command has been issued but before the differential lock is engaged, a presence of a rotational speed difference at the differential lock is checked, and the device is designed such that if a rotational speed difference is present, the rotational speed difference is reduced before the engagement of the differential lock is initiated.

11. The control unit according to claim 10, wherein the control unit carries out a method including if the locking command has been issued, engaging the differential lock as soon as there is essentially no rotational speed difference at the differential lock; after the locking command has been issued and before the differential lock is engaged, checking whether there is a rotational speed difference at the differential lock; and if a rotational speed difference exists, reducing the rotational speed difference before the differential lock is engaged.

12. A computer program product for a control unit for a differential lock of a differential, the control unit having a device by means of which, when a locking command has been issued, the differential lock is engagable as soon as there is essentially no rotational speed difference at the differential lock, such that by means of the device, when the locking command has been issued but before the differential lock is engaged, a presence of a rotational speed difference at the differential lock is checked, and the device is designed such that if a rotational speed difference is present, the rotational speed difference is reduced before the engagement of the differential lock is initiated, and the computer program product carrying out a routine for engaging the differential lock by implementing corresponding control commands stored in a software system.

13. The computer program product according to claim 12, in combination with a data carrier for storing the computer program product.

* * * * *